A. H. SMITH.
PNEUMATIC WHEEL.
APPLICATION FILED OCT. 11, 1911.

1,034,317.

Patented July 30, 1912.

INVENTOR
Albert H. Smith
BY Munn & Co.
ATTORNEYS

UNITED STATES PATENT OFFICE.

ALBERT HERMAN SMITH, OF TOPTON, PENNSYLVANIA.

PNEUMATIC WHEEL.

1,034,317.      Specification of Letters Patent.      Patented July 30, 1912.

Application filed October 11, 1911. Serial No. 653,982.

*To all whom it may concern:*

Be it known that I, ALBERT H. SMITH, a citizen of the United States, and a resident of Topton, in the county of Berks and State of Pennsylvania, have invented a new and Improved Pneumatic Wheel, of which the following is a full, clear, and exact description.

My invention relates to pneumatic wheels, my more particular purpose being to provide a wheel of this kind embodying a number of separate mechanical features whereby its efficiency is greatly increased.

Reference is to be had to the accompanying drawing forming a part of this specification in which like characters of reference indicate corresponding parts in all the views, and in which—

Figure 1:
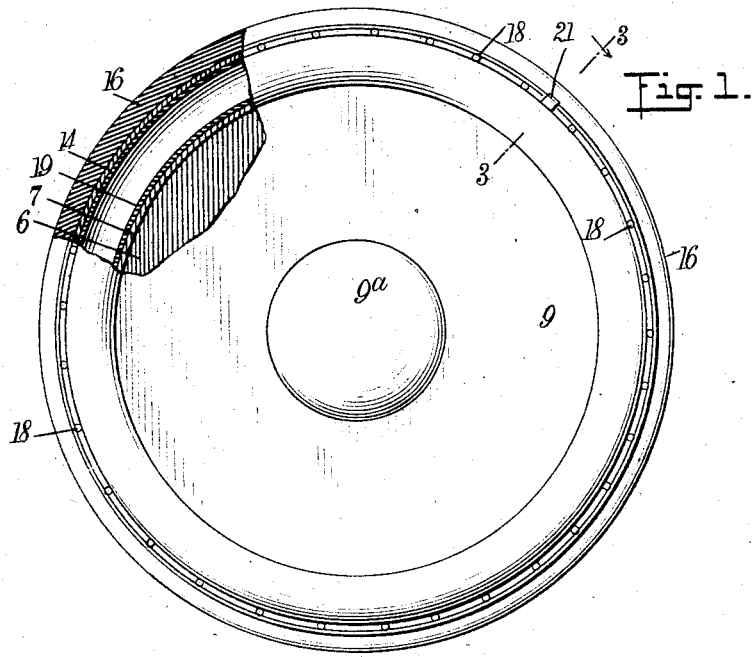
Figure 2:
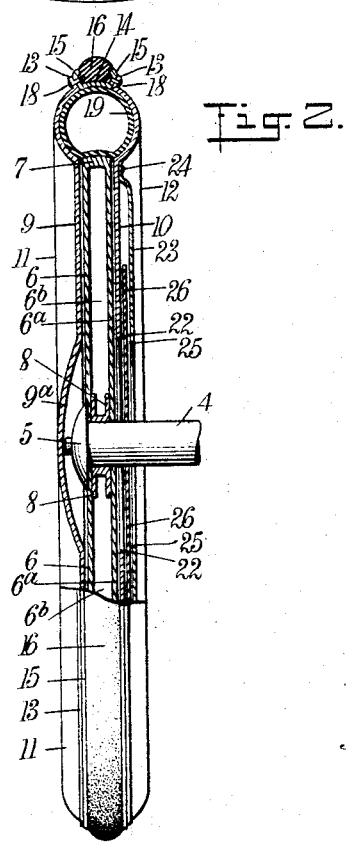

Figure 1 is a side view, partly broken away and partly in elevation, showing my pneumatic wheel; Fig. 2 is a substantially central vertical section through the same; and Fig. 3 is a section on the line 3—3 of Fig. 1, looking in the direction of the arrow.

An axle is shown at 4 and in this instance is a driving or revoluble axle. It it provided with a head 5 which may be integral with it. Encircling this axle is a hollow disk comprising an outer plate 6, an inner plate $6^a$ and a peripheral edge 7. Between the outer plate 6 and the inner plate $6^a$ is a compartment $6^b$. Mounted within this compartment is a spacing block 8 having, in this instance, the form of a short flat spool, and used for the purpose of conferring rigidity and strength upon the disk in question.

Figure 3:
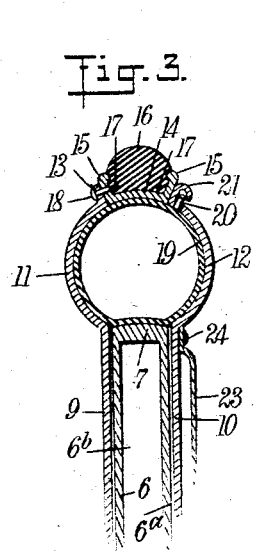

Disposed adjacent to the head 5 and loose relatively thereto is an outer plate 9 and an inner plate 10, these plates being provided respectively with annular portions 11, 12 each having an arcuate form in cross section, as indicated in Fig. 3. The annular portions 11, 12 are provided respectively with flanges 13 extending radially outward. An annular rim 14 is provided with flanges 15 integral therewith. Disposed between these annular flanges is a tire 16 which may be of rubber and is provided with a pair of wires 17 extending through the tire in the general direction of its length and following its general contour, being each thus of annular form. Bolts 18 extend through the flanges 13, 15 and thus hold the rim 14 in position relatively to the annular portions 11, 12.

A pneumatic cushion 19 having a general annular form is mounted between the annular portions 11, 12 and is adapted to be engaged by the inner surface of the rim 14. This pneumatic cushion 19 is provided with a nipple 20 by aid whereof it may be inflated after the manner of a pneumatic tire. Mounted upon the annular portion 12 is a flange 21 integral with it and bent over the nipple 20 for the purpose of protecting the same, as will be understood from Figs. 1 and 3.

The plate 10 is provided centrally with a large opening 22 and is thus of a general annular form. Mounted upon the plate 10 is a guide 23 having generally the form of a flat ring, its outer edge being bent slightly inward and secured against the adjacent surface of the plate 10 by aid of fastenings 24. The guide 23 is provided centrally with a large opening 25. Mounted rigidly upon the axle 4 and revoluble therewith is a disk 26 which extends between the guide 23 and the plate 10. This disk is loose relatively to the plate and guide last mentioned, so that the axle may move laterally in relation to the plates 9, 10. The disk 26 also serves to exclude dust and dirt from the inner portions of the wheel.

In assembling, the rim 14 is placed between the annular portions 11, 12 of the plates 9, 10 and assists in holding the annular cushion 19 in position. It will be noted that the edge 7 is loose relatively to the plates 9, 10, and engages the portion of smallest diameter of the annular cushion 19.

The parts are so constructed that the annular pneumatic member 19 is practically incased in metal and is strengthened and braced thereby both as against undue inflation and against punctures, blow-outs and the like. The amount of air pressure which the pneumatic member 19 can stand when within the wheel, as above described, is enormous, being limited only by the strength of its surroundings which may be made of metal, preferably steel.

In the use of this wheel severe jolts and shocks, which are often caused by the sudden and violent rebound of highly inflated tires, are not experienced. Moreover, rim cuts and the like which ordinarily necessitate the inflation of a tire under considerable air pressure cannot occur with this wheel. As a consequence, the amount of air pressure to which the annular pneumatic cushion 19 is subjected may be so chosen as to bring about the easiest riding qualities, this degree of inflation being all that is required for any size load.

It will be noted that the internal surface, that is, the portion of smallest diameter of the pneumatic cushion 19, by encircling the edge 7 of the disk carried by the axle, practically gives the pneumatic cushion 19 a tread upon its inner surface rather than upon its outer surface.

The parts above described being relieved in a great measure of all and friction have little or no tendency to overheat or to devulcanize the parts made of rubber.

The operation of my device is as follows:—The parts being made and assembled as above described, and the annular cushion 19 being inflated, the weight of the axle 4 and parts carried thereby rests directly upon the inner surface of the pneumatic cushion 19 and is thence transferred to the tire 16. The edge 7 of the disk carried by the axle 4 being loose relatively to the plates 9, 10, is free to move relatively to these plates and to the tire 16, the limit of movement being the degree of compression which the annular cushion 19 can undergo. This cushion is not a tire in the true sense of the word, and as it is protected on all sides it can be made considerably thinner than tires are usually made.

Having thus described my invention, what I claim as new and desire to secure by Letters Patent is:—

1. In a pneumatic wheel, the combination of a revoluble axle, a disk mounted thereupon and provided with a peripheral edge, a pneumatic cushion of annular form encircling said disk and having its inner periphery engaging said edge, and a pair of plates disposed upon opposite sides of said disk and provided with portions engaging said pneumatic cushion said cushion having a valve tube projecting exteriorly through one of said plates, and said last-mentioned plate having its peripheral edge formed with a flange bent to house and protect said valve tube.

2. In a pneumatic wheel, the combination of an outer plate and an inner plate, said outer plate and said inner plate being provided with annular portions, an annular cushion disposed between said annular portions, a rim also disposed intermediate said annular portions and engaging the outer periphery of said pneumatic cushion, a tire engaging said rim, a disk slidably mounted between said outer plate and said inner plate and provided with an edge engaging the inner periphery of said annular cushion, a revoluble shaft secured rigidly to said disk and movable in a lateral direction relatively to said outer plate and said inner plate said inner plate having a central opening surrounding said shaft, a circular supplemental plate secured at its edge to said inner plate in spaced relation, and having a central opening surrounding the shaft, and a circular plate secured to and extending around the shaft and projecting between the said inner plate and the said supplemental plate, for the purpose described.

3. In a pneumatic wheel, the combination of an annular cushion, inner and outer circular plates disposed upon opposite sides of said cushion and having annular enlargements adjacent their edges adapted to form a channel to receive and support the said cushion, a rim secured between the peripheral edges of said plates and disposed upon the outer periphery of said cushion, a tire mounted in said rim, said outer plate consisting of a substantially unbroken web of material and said inner plate having a central opening, a shaft having its end extending through the central opening of said inner plate, a circular disk secured upon said shaft and projecting between said inner and outer plates and having its peripheral edge engaging the inner periphery of said cushion, a supplemental plate secured around its edge to the inner plate in spaced relation; and a plate secured to said shaft and projecting between the said inner plate and the said supplemental plate, all for the purpose described.

In testimony whereof I have signed my name to this specification in the presence of two subscribing witnesses.

ALBERT HERMAN SMITH.

Witnesses:
  C. HAROLD TREXLER,
  MARY S. SMITH.